United States Patent [19]

Lechter et al.

[11] Patent Number: 5,298,484

[45] Date of Patent: Mar. 29, 1994

[54] HIGH TC COPPER-OXIDE SUPERCONDUCTORS COMPRISING TL-SR-CA-CU-O

[75] Inventors: William L. Lechter, Rockville; Michael S. Osofsky, Burtonsville, both of Md.; Earl F. Skelton; Louis E. Toth, both of Washington, D.C.

[73] Assignee: The United States of America as represented by the Secretary of the Navy, Washington, D.C.

[21] Appl. No.: 860,721

[22] Filed: Mar. 31, 1992

Related U.S. Application Data

[62] Division of Ser. No. 433,245, Nov. 8, 1989, Pat. No. 5,120,704.

[51] Int. Cl.$^5$ ............ C01F 11/02; C01G 3/02; C01G 15/00; H01L 39/12
[52] U.S. Cl. ............ 505/1; 252/518; 252/521; 505/783
[58] Field of Search ............ 252/518, 521; 501/123, 501/152; 505/1, 783

[56] References Cited

U.S. PATENT DOCUMENTS

| | | | |
|---|---|---|---|
| 4,870,052 | 9/1989 | Engler | 501/123 |
| 4,880,733 | 11/1989 | Itozaki | 252/521 |
| 4,962,083 | 10/1990 | Hermann | 501/123 |
| 5,017,554 | 5/1991 | Subramanian | 503/783 |
| 5,036,044 | 7/1991 | Hermann | 501/123 |
| 5,066,635 | 11/1991 | Sheng | 501/123 |
| 5,120,704 | 6/1992 | Lechter | 505/783 |
| 5,164,362 | 11/1992 | Hermann | 505/783 |

FOREIGN PATENT DOCUMENTS

0208325  8/1989  Japan .................... 505/783

OTHER PUBLICATIONS

Matsuda et al., "Superconductivity Of Tl-Sr-Ca-Cu-O System In Relation To Tl-Ba-Ca-Cu-O And Bi-Sr-Ca-Cu-O Systems", Sep. 17, 1988, pp. 2062-2064.

Lechter et al., "Bulk Superconductivity Above 100 K in the Tl-Sr-Ca-Cu System", Sol. St. Comm., 68, pp. 519-521 (1988).

Haldar et al., "A New High Tc Superconductor Containing Thallium and Its Crystal Structure: The '1212' Phase $(Tl_{1-x}Bi_x)_{1.33}Sr_{1.33}Ca_{1.33}Cu_2O_{6.67+}$", j. Supercond., 1, pp. 211-218 (1988).

Domenges, "HREM Study of the 120K-Superconductor $TlBa_2Ca_2Cu_3O_{10-y}$", Solid State Comm., vol. 68, No. 3, pp. 303-308, 1988.

Lang, "Structural Characterization of a TlCaBaCu Oxide in $T_c$ Set $=155K$ and $T_c$ Zero$=123K$ Superconducting Specimens", Appl. Phys. Lett. 53(15), Oct. 10, 1988, pp. 1434-1436.

Wu, "A New Method For The Preparation of The Superconducting $Tl_cCaBa_2Cu_2O_8$ Compound", Materials Lett., vol. 7, No. 5,6, November 1988, pp. 169-171.

Tien, "Hot Isostatic Pressing (HIP) For The Densification of Oxide Superconductors", Mrs: High Temp Super. II, April 1988, pp. 73-76.

Sheng, "Superconductivity In The Tl-Sr-Ca-Cu-O System", Physical Review B, vol. 38, No. 10, October 1988, pp. 7074-7076.

(List continued on next page.)

Primary Examiner—Linda Skaling
Assistant Examiner—John Boyd
Attorney, Agent, or Firm—Thomas E. McDonnell; Barry A. Edelberg

[57] ABSTRACT

High $T_c$ superconducting compounds are made by forming a reaction mixture of the oxides of Sr, Cu, Ca and Tl, compressing these into a hardened body, and placing the hardened body into a container. The container is then evacuated and sealed. The hardened body is heated under pressure until the oxides of Sr, Ca, Cu, and Tl react to form a superconducting compound.

3 Claims, No Drawings

OTHER PUBLICATIONS

Soeta, "Relationship Between Crystal Structures and Solid Solution of Tl-Sr-Ca-Cu-O and Tl-Ba-Ca-Cu-O Superconductors", Japanese Journal of Appl. Phys., vol. 28, No. 7, July 1989, pp. L1186–1187.

Tai, "Bulk Superconductivity in the New Orthorhombic (Tl, Pb)-Ca-Sr-Cu-O System", Journal of Appl. Phys., vol. 27, No. 12, December 1988, pp. L2287–L2288.

Wu, "New Reaction Routes for Preparing Single-Phase $Tl_2$-$CaBa_2Cu_2O_8$ and $Tl_2Ca_2Ba_2Cu_3O_{10}$ Powders From Stoichiometric Mixtures", Japanese Journal of Appl. Phys., vol. 28, No. 8, August 1989, pp. L1349–L1151.

Nagashima, "Improving Superconducting Characteristics of Tl-Sr-Ca-Cu-O By Doping With Pb and?or Rare-Earth Elements", Japanese Journal of Appl. Phys. vol. 28, No. 6, June 1989, pp. L930–L933.

Martin, "Structural Peculiarities of the '1212' Superconductor $Tl_{0.5}Pb_{0.5}Sr_2CaCu_2O_7$", Physica C 157 (1989) 460–468.

Hayri, "Superconductivity in $Tl_2Ba_{2-x}Sr_2CaCu_2O_8$ Solid Solutions: $T_c=44$ K For A Composition With x=2.0", Physica C 156 (1988) 775–780.

Ganguli "$Tl_{1-x}Pb_xCaSr_2Cu_2O_7$: Another 1122 High-$T_c$ Superconductor" Physica C vol. 156 Dec. 1988 pp. 788–790.

Nagashima "Superconductivity in $Tl_{1.5}SrCaCu_2O_x$" Jap. Jul. Appl. Phys. vol. 27(6) June 1988 pp. 1077–1079.

HIGH TC COPPER-OXIDE SUPERCONDUCTORS COMPRISING TL-SR-CA-CU-O

This application is a divisional application of U.S. Ser. No. 07/433,245, filed Nov. 8, 1989 now U.S. Pat. No. 5,120,704.

BACKGROUND OF THE INVENTION

1. FIELD OF THE INVENTION:

This invention relates to a new copper-oxide high $T_c$ (above 100 K) superconductor, Tl-Sr-Ca-Cu-oxide.

2. DESCRIPTION OF THE BACKGROUND ART:

Since 1987, there has been considerable research on high $T_c$ copper oxide superconductors. Superconductors with $T_c$'s greater than 77 K include, for example, Y(RE)Ba$_2$Cu$_3$O$_7$, Bi$_2$Sr$_2$CaCu$_2$O$_x$ and Tl$_2$Ba$_2$Ca$_2$Cu$_3$O$_{10}$, this latter compound having the highest known $T_2$ (C. C. Torardi, M. A. Subramanian, J. C. Calabrese, J. Gopalakrishnan, K. J. Morrissey, T. R. Askew R. B. Flippen, U. Chowdhry, and A. W. Sleight. Science 240, 631–634 (1988)). While these compounds are complex layered structures, only a very limited number of combinations of elements are favorable for superconductivity. In addition to Cu and O, which all known high $T_c$ compounds contain, the known favorable combinations are 1) a rare earth element (RE) and Ba, 2) Bi, Sr and Ca and 3) Tl, Ba and Ca. Numerous attempts to expand the list of combinations have failed. Although Ba and Sr are chemically similar, attempts to substitute Sr for Ba and vice-versa in the above combinations have been unsuccessful. For example, attempts to substitute Sr for Ba in Tl-Ba-Ca-Cu-O systems to fabricate superconducting Tl-Sr-Ca-Cu-O systems using current conventional ceramic processing techniques have all failed. Although Sr has been partially substituted for Ba in Tl compounds, it has resulted in a substantial lowering of $T_c$ (M. A. Subramanian, C. C. Torardi, J. Gopalakrishnan, P. L. Gai, J. C. Calabrese, T. R. Askew, R. B. Flippen, and A. W. Sleight. "Bulk Superconductivity Up To 122 K In The Tl-Pb-Sr-Ca-Cu-O System"). One probable reason for this is that Ba and Sr have different ionic sizes which causes the analog compounds to be energetically unfavorable.

In addition to the inability to substitute Sr for Ba in forming superconducting compounds, there is also a problem in forming superconducting Tl containing compounds. A major problem with any Tl-based compound is its toxicity. Tl has a relatively high vapor pressure at temperatures needed to react superconducting compounds.

SUMMARY OF THE INVENTION

Accordingly, it is an object of this invention to form superconducting compounds with $T_c$'s in excess of 100 K.

It is also an object of this invention to form a Tl-Sr-Ca-Cu-oxide superconducting compound.

It is a further object of this invention to eliminate the Tl-vapor contamination problem.

These and additional objects of the invention are accomplished by forming high T superconducting compounds. A reaction mixture of the oxides of Sr, Cu, Ca and Tl is formed, compressed into a hardened body, and placed into a container. The container is then evacuated and sealed. The hardened body is heated under pressure until the oxides of Sr, Ca, Cu, and Tl react to form a superconducting compound.

DETAILED DESCRIPTION OF THE INVENTION

The starting materials of the invention are the oxides of strontium, calcium, copper and thallium, in the correct stoichiometric proportions to make the desired compound, a Tl-Sr-Ca-Cu-oxide superconducting compound having a $T_c$ above 100 K. Preferably, the superconducting compound is selected from the group comprising TlSr$_2$CaCu$_2$O and TlSr$_2$Ca$_2$Cu$_{3.4}$O$_x$ wherein x represents a fully oxygenated compound. Most preferably, x is between about 7 and 17.

Although the starting materials can be mixed to form a reaction mixture to make the superconducting compound, it is preferable to obtain the oxides strontium and calcium by converting the carbonates of strontium and calcium to their respective oxides. Most preferably, the powders of SrCO$_3$, CuO, and CaCO$_3$ are mixed and this powdered mixture is calcined in order to convert the carbonates to oxides. Tl$_2$O$_3$ is then added to this mixture to form a reaction mixture.

If a powdered mixture of SrCO$_3$, CuO, and CaCO$_3$ is calcined to obtain the oxides, it is preferable to calcine the powdered mixture in an air or oxygen atmosphere at a temperature from about 800° C. to about 1000° C. for between about 3 to about 10 hours, long enough to convert the carbonates to oxides. Actually, the time required to calcine the mixture depends on the particle size of the powder, since smaller particles will require less time than larger particles. Most preferably, the powder mixture is subjected to a temperature of from about 910° C. to about 940° C. for about 3 hours in an air atmosphere.

The reaction mixture should be finely ground. This is because an increased surface area allows for greater efficiency of reaction, decreasing reaction time and increasing product yield. Preferably, the reaction mixture consists of particles having an average diameter of from about 2 to about 10 microns in diameter.

The reaction mixture is then compacted into some type of hard body. This is done so that the reaction mixture can be easily worked and also because in subsequent reaction steps, loose powders have a tendency to either migrate into their containers or weld to their containers. Although the reaction mixture can be compacted into any form, depending on the ultimate application for the superconducting compound, it is preferable to compact the reaction mixture into a pellet. Most preferably, the pellet is in the shape of a rod about 13 mm long and about 6 mm in diameter.

The hard body is then sealed in a container that will effectively seal the pellet from the outside environment and will prevent any of the reactants, such as toxic thallium vapors, from escaping. Preferably, the hard body is placed in a non-reactive container that, when evacuated, sealed and heated, will melt around the hard body. Examples of such containers are pyrex tubes and stainless steel envelopes. In the latter embodiment, it is preferred to wrapped the hard body in platinum foil to minimize any unwanted reactions between the pellet and the stainless steel. Most preferably, glass tube made of PYREX ® (Corning Glass Works registered trademark for borosilicate glass) is used as a container.

The container is evacuated to as low a pressure as possible so that, when the container melts, it will effectively seal the hard body from the surroundings. Preferably, a pressure of at least about 20 mtorr is sufficient. Then the container is sealed.

The hard body, now in the sealed container, is then heated under pressure until the oxides of Tl, Sr, Ca, and Cu react to form the superconducting compound. Preferably, a temperature from about 800° C. to about 950° C at a pressure of at least about 30,000 psi is sufficient for reaction to occur. However, reaction conditions will vary within this range depending on the container used. Some containers may melt around the pellet quickly enough at the reaction temperature so that no pre-heating of the container is required. For instance, if a stainless steel envelope is used for the container, preferably the hard body in the container is heated at a temperature from about 800° C. to about 950° C. and a pressure of at least about 30,000 psi for from about 50 minutes to about 80 minutes. On the other hand, some containers may require preheating, in order to melt the container around the hard body. For example, if the hard body is sealed in pyrex, it is preferable to first pre-heat the hard body in the container to a temperature from about 700° C. to about 800° C. at a pressure of at least about 100 psi for from about 20 minutes to about 40 minutes. This is because, unlike stainless steel, PYREX takes longer to melt and surround the pellet. After the PYREX melts, the heat is increased to from about 850° C. to about 950° C. while simultaneously increasing the pressure to at least about 30,000 psi over a period of from about 25 minutes to about 40 minutes.

Any reaction apparatus that will provide the necessary heat and constant pressure can be utilized for the above process. Preferably, a hot isostatic press (HIP) is used.

Following reaction, the superconducting compound is cooled to about room temperature and returned to atmospheric pressure over a period of from about 15 minutes to about 30 minutes. The container is removed from the superconducting compound.

Having described the invention, the following examples are given to illustrate specific applications of the invention. These specific examples are not intended to limit the scope of the invention described in this application.

EXAMPLE I

Amounts of $SrCO_3$, $CuO$, $CaCO_3$, and $Tl_2O_3$ were weighed out in proportions to form an approximate stoichiometry of $TlSr_2CaCu_{2-3}O_x$, where x would be the amount of oxygen taken up by the sample during the processing. Samples were prepared by finely grinding and mixing the $SrCO_3$, $CuO$ and $CaCO_3$ and calcining the sample mixture at 915 C. for 3.5 hours. The resulting compound was reground and mixed with the $Tl_2O_3$.

This mixture was then pressed into a rod 13 mm long and 6 mm in diameter, wrapped in a platinum foil and sealed in an evacuated (20 mtorr) stainless steel envelope. The sample was reacted at 850 C. and 30,000 psi for 1 hour in a hot isostatic press (HIP) and then returned to room temperature and atmospheric pressure in 15 minutes. The stainless steel envelope was removed from the resulting product.

X-ray fluorescent, SEM/EDX, and electron microprobe analysis indicated a composition of $TlSr_2CaCu_2O_x$. Indium leads were soldered to the sample and four-probe ac (25.5 Hz) resistance measurements were made as a function of temperature. The material exhibited metallic behavior from room temperature to 109 K at which point the onset of superconductivity occurred. The superconductive transition was reasonably sharp: by 106 K, the resistance had decreased by 90% and by 104 K, it was immeasurably small.

Temperature dependent dc susceptibility measurements were performed in a magnetic field of 200 G. The material appeared to be slightly paramagnetic immediately above the superconductive transition and showed two distinct diamagnetic transitions occurring at 119 K and 70 K. The signal saturated below 50 K at a value which corresponded to expulsion of the magnetic field from 20% of the sample volume.

EXAMPLE II

Amounts of $SrCO_3$, $CuO$, $CaCO_3$, and $Tl_2O_3$ were weighed out in proportions to form an approximate stoichiometry of $TlSr_2CaCu_{2-3}O_x$, where x would be the amount of oxygen taken up by the sample during I7 the processing. Samples were prepared by finely grinding and mixing the $SrCO_3$, $CuO$ and $CaCO_3$ and calcining the sample mixture at 915 C. for 3.5 hours. The resulting compound was reground and mixed with the $Tl_2O_3$.

This mixture was then pressed into a rod 13 mm long and 6 mm in diameter and sealed in an evacuated (20mtorr) PYREX. The sample was heated at 750C. at 100 psi in a hot isostatic press (HIP) for 30 minutes. The temperature and pressure were then increased to 850 C. and 30,000 psi for 30 minutes in the HIP to allow the mixture to react. The resulting product was returned to room temperature and atmospheric pressure in 15 minutes. The PYREX container was removed from the resulting product.

X-ray fluorescent, SEM/EDX, and electron microprobe analysis indicated a composition of $TlSr_2CaCu_2O_x$. Indium leads were soldered to the sample and four-probe ac (25.5 Hz) resistance measurements were made as a function of temperature. The material exhibited metallic behavior from room temperature to 109 K at which point the onset of superconductivity occurred. The superconductive transition was reasonably sharp: by 106 K, the resistance had decreased by 90% and by 104 K, it was immeasurably small.

Temperature dependent dc susceptibility measurements were performed in a magnetic field of 200 G. The material appeared to be slightly paramagnetic immediately above the superconductive transition and showed two distinct diamagnetic transitions occurring at 119 K and 70 K. The signal saturated below 50 K at a value which corresponded to expulsion of the magnetic field from 20% of the sample volume.

Obviously, many modifications and variations of the present invention are possible in light of the above teachings. It is therefore to be understood that within the scope of the appended claims, the invention may be practiced otherwise than as specifically described.

We claim:
1. A superconducting body made by a process comprising the steps of:
   forming a reaction mixture of oxides of Sr, Cu, Ca, and Tl in stoichiometric proportions to make a Tl-Sr-Ca-Cu-oxide high $T_c$ superconducting compound;
   compressing the reaction mixture into a hard body;
   placing the hard body into a container for containing thallium vapor;

evacuating and sealing the hard body in the container;
heating the hard body and the container at a temperature of about 800° C. to about 950° C. and under pressure of at least about 30,000 psi until the oxides of Tl, Sr, Ca, and Cu react to form a superconducting compound; and
cooling the superconducting compound to room temperature and returning the superconducting compound to atmospheric pressure;
said superconducting compound being selected from the group consisting of $TlSr_2CaCu_2O_x$ and $TlSr_2Ca_2Cu_3O_x$ wherein x is from about 7 to about 17, said superconducting body having a resistance of about 0 m$\Omega$ at about 104 K.

2. A superconducting body according to claim 1 comprising at least two superconducting phases.

3. A superconducting body according to claim 2, comprising first superconducting phase exhibiting a diamagnetic transition at about 119K and a second superconducting phase exhibiting a diamagnetic transition at about 70K.

* * * * *